United States Patent
Singh et al.

(10) Patent No.: US 12,107,659 B2
(45) Date of Patent: Oct. 1, 2024

(54) SYSTEM AND METHOD FOR DESIGNING LOW-COMPLEXITY LINEAR RECEIVERS FOR OTFS SYSTEM

(71) Applicant: INDIAN INSTITUTE OF TECHNOLOGY KANPUR, Kanpur (IN)

(72) Inventors: Prem Singh, Bangalore (IN); Rohit Budhiraja, Kanpur (IN)

(73) Assignee: INDIAN INSTITUTE OF TECHNOLOGY (IN)

( * ) Notice: Subject to any disclaimer, the term of this patent is extended or adjusted under 35 U.S.C. 154(b) by 0 days.

(21) Appl. No.: 18/058,893

(22) Filed: Nov. 28, 2022

(65) Prior Publication Data

US 2024/0187081 A1 Jun. 6, 2024

(51) Int. Cl.
 *H04B 7/08* (2006.01)
 *H04B 7/0456* (2017.01)
(52) U.S. Cl.
 CPC ......... *H04B 7/0854* (2013.01); *H04B 7/0456* (2013.01)
(58) Field of Classification Search
 CPC .......................... H04B 7/0854; H04B 7/0456
 See application file for complete search history.

(56) References Cited

U.S. PATENT DOCUMENTS

| | | | |
|---|---|---|---|
| 9,867,065 B2 | 1/2018 | Hadani et al. | |
| 10,090,972 B2 | 10/2018 | Hadani et al. | |
| 10,090,973 B2 | 10/2018 | Hadani et al. | |
| 10,469,215 B2 | 11/2019 | Rakib et al. | |
| 11,038,733 B2 | 6/2021 | Hadani et al. | |
| 11,456,908 B2 | 9/2022 | Rakib et al. | |
| 2011/0211628 A1* | 9/2011 | Hammarwall | H04B 7/0417 375/224 |
| 2012/0269237 A1* | 10/2012 | Kim | H04B 1/707 375/147 |
| 2022/0085928 A1 | 3/2022 | Sathyanarayan et al. | |
| 2023/0412444 A1* | 12/2023 | Hadani | H04L 5/0044 |

* cited by examiner

*Primary Examiner* — Dac V Ha
(74) *Attorney, Agent, or Firm* — Jason C. Cameron

(57) ABSTRACT

A method for designing a low-complexity linear minimum mean squared error (LMMSE) and zero-forcing (ZF) receivers for MIMO-RCP-OTFS system is disclosed. The method includes steps of: computing a received signal vector (r) and structure of a matrix ($\Psi$) using a channel matrix (H); reordering the matrix ($\Psi$) to reduce bandwidth of the matrix ($\Psi$); computing inverse of a banded matrix (G=LU) by multiplying the matrix ($\Psi$) with permutation matrix (P) and with transpose of permutation matrix ($P^T$) using Cholskey decomposition; calculating LMSSE/ZF equalized vector ($\tilde{r}_{ce}$) by multiplying inverse of banded matrices with $B_w$ bandwidth (L and U), with the received signal vector ($\bar{r}=P\bar{r}$) using forward and backward substitution algorithms; reordering the vector ($\tilde{r}_{ce}$) to calculate vector (y); and calculating data vector ($\hat{d}$) representing an estimation of low-complexity LMMSE/ZF equalization by multiplying Hermitian matrix (B) with the vector (y).

8 Claims, 8 Drawing Sheets

SYSTEM AND METHOD FOR DESIGNING LOW-COMPLEXITY LINEAR RECEIVERS FOR OTFS SYSTEM

FIELD OF INVENTION

Embodiments of the present disclosure relates to a receiver and more particularly relates to a system and method for designing a low-complexity linear minimum mean squared error (LMMSE) and zero-forcing (ZF) receivers for a multiple-input multiple-output orthogonal time frequency space (MIMO-OTFS) system.

BACKGROUND

Orthogonal time frequency space (OTFS) modulation is a two-dimensional waveform which multiplexes transmit symbols in the delay-Doppler domain and is robust to a high Doppler spread. This is unlike a widely popular orthogonal frequency division multiplexing (OFDM), which multiplexes symbols in the time-frequency domain and is sensitive to the high Doppler spread. The OTFS modulation has significantly lower bit error rate (BER) than OFDM for high-speed vehicular communication with speeds between 30 km/h to 500 km/h.

For example, high-speed mobile applications such as a vehicle-to-everything, and high-speed trains pose a significant challenge in designing future wireless communication systems. The High Doppler spread, and multipath propagation observed in such applications result in a doubly dispersive channel, which significantly degrades its estimation, and consequently the bit error rate (BER) of orthogonal frequency division multiplexing (OFDM) scheme, which multiplexes symbols in the time-frequency (TF) domain.

Hadani et al., 2021, in their patent, "Orthogonal time frequency space modulation techniques" disclosed a fundamental theory of the OTFS and its benefits. The prior art discloses a mathematical description of the doubly fading Delay-Doppler channel and a development of a modulation that is tailored to the doubly fading Delay-Doppler channel. In another example, Hadani et al., 2018, in their patent, "System and method for two-dimensional equalization in an orthogonal time frequency space communication system" disclosed the possible ways of implementing orthogonal time frequency space (OTFS) systems over a wireless channel. Furthermore, the prior art discloses that a 2D equalization needs to be performed in each for these systems. Although, the prior art talks about the 2D equalization, it does not disclose about how to perform the 2D equalization in OTFS systems.

In yet another example, Sathyanarayan et al., 2022, in their patent application, "Implementation of orthogonal time frequency space modulation for wireless communications", also disclosed the possible ways of implementing orthogonal time frequency space (OTFS) systems over a wireless channel. In yet another example, Hadani et al., 2021, in their patent application, "Orthogonal time frequency space communication system compatible with OFDM", disclosed about how OTFS waveform can be used with the exiting orthogonal frequency division multiplexing (OFDM)-based framework.

In yet another example, Hadani et al., 2108, in their patent, "Multiple access in an orthogonal time frequency space communication system", disclosed about multiple access methods using OTFS modulation. In yet another example, Hadani et al., 2018, in their patent, "OTFS methods of data channel characterization and uses thereof", disclosed about methods of using OTFS pilot symbol waveform bursts to automatically produce a detailed 2D model of channel state.

In yet another example, Hadani et al., 2019, in their patent, "Orthogonal time frequency space modulation system for the Internet of Things", disclosed about system and method of operating an Internet of Things (IoT) device and an IoT manager device. The prior art discloses that the method includes determining, during operation of the IOT device in a low power mode, an OTFS transmission waveform using two-dimensional (2D) channel state information relevant to a delay-Doppler channel domain. The method further includes transmitting, during operation of the IOT device in a high power mode, the OTFS transmission waveform.

Similar to the deployment of 4G/5G wireless systems, linear receivers in above said prior art references are expected to be used for the deployment of OTFS-based systems. OTFS waveform, after interacting with a channel, results in a twisted convolution, which radically increases receiver computational complexity.

Therefore, there is a need for system and method for designing a low-complexity linear minimum mean squared error (LMMSE) and zero-forcing receivers for a multiple-input multiple-output orthogonal time frequency space (MIMO-OTFS) system, to address the aforementioned issues.

SUMMARY

In accordance with one embodiment of the disclosure, a method for designing low-complexity linear minimum mean squared error (LMMSE) and zero-forcing (ZF) receivers for a multiple input multiple output reduced cyclic prefix orthogonal time frequency space (MIMO-RCP-OTFS) system is disclosed. The method includes following steps of: computing a received signal vector (r) and a structure of matrix ($\Psi$) using a channel matrix (H); reordering the matrix ($\Psi$) to reduce a bandwidth of the matrix ($\Psi$), wherein the reordering of the matrix ($\Psi$) is performed using a reverse Cuthil-mckee algorithm, and wherein the reverse Cuthil-mckee algorithm computes a permutation matrix (P) to reorder the matrix ($\Psi$); computing a low-complexity inverse of a banded matrix (G=LU) by multiplying the matrix ($\Psi$) with the permutation matrix (P) and with the transpose of the permutation matrix ($P^T$) followed by a low-complexity Cholskey decomposition, wherein L and U are banded matrices with a bandwidth ($B_w$); calculating a vector ($\tilde{r}_{ce}$) by multiplying an inverse of the banded matrices with the $B_w$ bandwidth (L and U), with a vector ($\bar{r}=P\bar{r}$) using low-complexity forward and backward substitution algorithms; reordering the vector ($\tilde{r}_{ce}$) to calculate a vector (y), wherein the vector (y) is calculated by multiplying the transpose of the permutation matrix ($P^T$) with the vector ($\tilde{r}_{ce}$); and calculating a data vector ($\hat{d}$) that represents an estimation of the low-complexity LMMSE/ZF estimate by multiplying Hermitian matrix (B) with the vector (y).

In an embodiment, the low-complexity forward substitution algorithm calculates a vector (v) by multiplying an inverse of the banded matrix with the $B_w$ bandwidth (L) with the vector ($\bar{r}=P\bar{r}$).

In another embodiment, the low-complexity backward substitution algorithm calculates the LMSSE/ZF estimated vector ($\tilde{r}_{ce}$) by multiplying an inverse of the banded matrix with the $B_w$ bandwidth (U) with the vector (v).

In yet another embodiment, the method further includes computing a vector ($\tilde{r}$) by multiplying Hermitian channel matrix ($H^\dagger$) with the received signal vector (r).

In one aspect, a system for designing a low-complexity linear minimum mean squared error (LMMSE)/zero-forcing (ZF) receivers for a multiple input multiple output reduced cyclic prefix orthogonal time frequency space (MIMO-RCP-OTFS) system is disclosed. The system includes a hardware processor and a memory that is coupled to the hardware processor. The memory includes a set of program instructions executed by the hardware processor that is configured to: compute a received signal vector (r) and a structure of matrix ($\Psi$) using a channel matrix (H); reorder the matrix ($\Psi$) to reduce a bandwidth of the matrix ($\Psi$); compute a low complexity inverse of a banded matrix (G=LU) by multiplying the matrix ($\Psi$) with the permutation matrix (P) and with the transpose of the permutation matrix ($P^T$) followed by the low complexity Cholskey decomposition, wherein L and U are banded matrices with a bandwidth ($B_w$); calculate a vector ($\tilde{r}$) by multiplying an inverse of the banded matrices with the $B_w$ bandwidth (L and U) with a vector ($\bar{r}=P\tilde{r}$) using low-complexity forward and backward substitution algorithms; reorder the vector ($\tilde{r}_{ce}$) to calculate a vector (y); and calculate a data vector ($\hat{d}$) that represents an estimation of the low-complexity LMMSE/ZF receiver by multiplying Hermitian matrix (B) with the vector (y).

In an embodiment, the reordering of the matrix ($\Psi$) is performed using a reverse Cuthil-mckee algorithm and the reverse Cuthil-mckee algorithm computes a permutation matrix (P) to reorder the matrix ($\Psi$). In another embodiment, the vector (y) is calculated by multiplying the transpose of the permutation matrix ($P^T$) with the LMSSE/ZF estimated vector ($\tilde{r}_{ce}$).

In yet another embodiment, the low-complexity forward substitution algorithm calculates a vector (v) by multiplying an inverse of the banded matrix with the $B_w$ bandwidth (L) with the inverse of the signal vector ($\bar{r}=P\tilde{r}$).

In yet another embodiment, the low-complexity backward substitution algorithm calculates the LMSSE/ZF estimate ($\tilde{r}_{ce}$) by multiplying an inverse of the banded matrix with the $B_w$ bandwidth (U) with the vector (v).

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
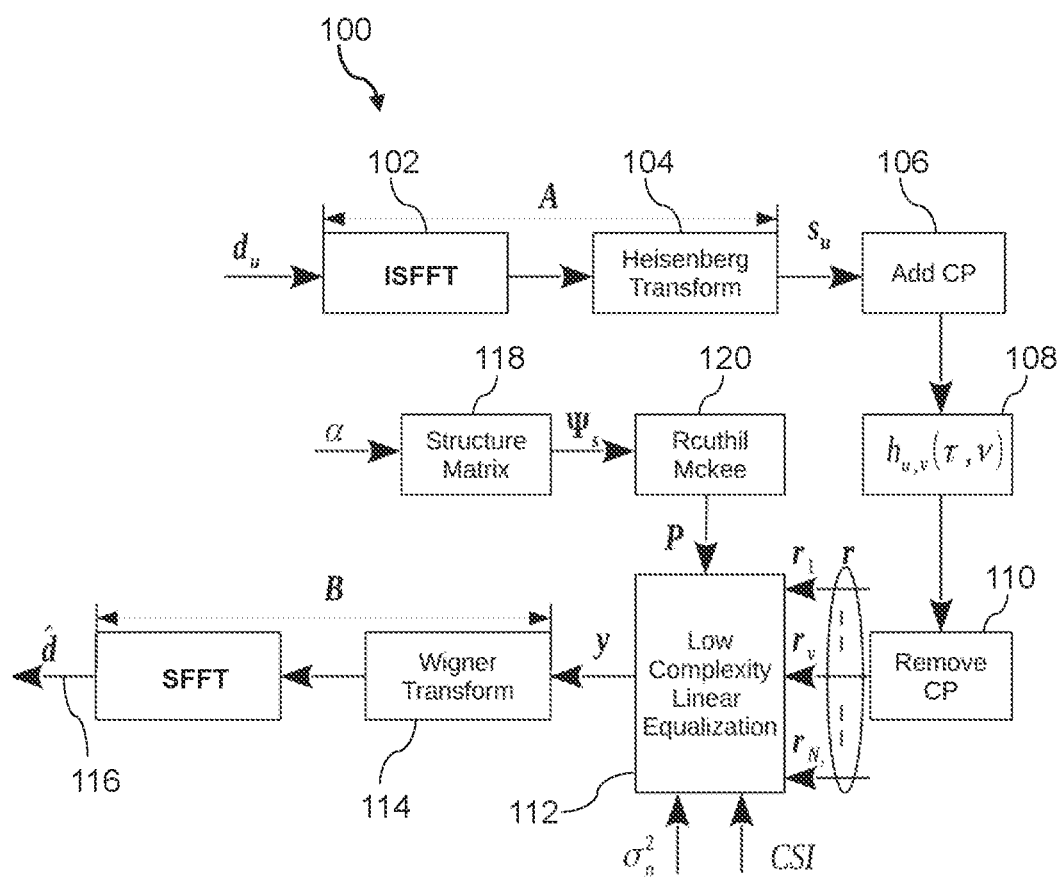
FIG. 1 is a schematic representation of a multiple-input multiple-output orthogonal time frequency space (MIMO-OTFS) system with a low-complexity linear minimum mean squared error (LMMSE)/zero-forcing (ZF) receiver, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, devices, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

FIG. 1 is a schematic representation of a multiple-input multiple-output orthogonal time frequency space (MIMO-OTFS) system 100 with a low-complexity linear minimum mean squared error (LMMSE) and zero-forcing (ZF) receivers, in accordance with an embodiment of the present disclosure. The LMMSE/ZF receiver utilizes inherent channel sparsity and channel-agnostic structure of plurality of matrices that are involved in at least one of: the LMMSE receiver and a zero forcing (ZF) receiver. In an embodiment, the LMMSE/ZF receiver includes a log-linear complexity.

The multiple-input multiple-output orthogonal time frequency space (MIMO-OTFS) system 100 includes a continuous implementation of OTFS transmission system. The OTFS transmission system includes $N_t$ transmit and $N_r$ receive antennas. Each OTFS frame includes a duration of $T_f$ and includes N symbols, such that $T_f$=NT. Further, the OTFS transmission system includes a bandwidth of B Hz, which is divided into M-subcarriers of a spacing $\Delta f$ such that B=M$\Delta f$. The $u_{th}$ transmit antenna transmits a quadrature amplitude modulation (QAM) symbol $d_u(k,l)$ over the $k_{th}$ Doppler and $l_{th}$ delay bin, where k∈[0N−1], l∈[0M−1], and u∈[1,$N_t$]. In an embodiment, the symbols $d_u(k,l)$ include zero mean and are independent and identically distributed with power $\sigma_d^2$. The symbols $d_u(k,l)$ are mapped to a time-frequency domain symbol $Z_u(n,m)$ using an inverse symplectic finite Fourier transform (ISFFT) 102 as:

$$Z_u(n, m) = \frac{1}{\sqrt{NM}} \sum_{k=0}^{N-1} \sum_{l=0}^{M-1} d_u(k, l) e^{j2\pi \left[\frac{nk}{N} - \frac{ml}{M}\right]}.$$ Eqn. (1)

Here n∈[1N−1] and m∈[0M−1]. The time domain signal from the $u_{th}$ antenna is obtained from $Z_u$(n,m) using the Heisenberg transform 104 as:

$$S_u(t) = \sum_{n=0}^{N-1} \sum_{m=0}^{M-1} Z_u(n, m) g(t - nT) e^{j2\pi m \Delta f(t-nT)}.$$ Eqn. (2)

Here g(t) is the time-domain pulse-shaping filter of duration T. A sampling interval is considered to be $T_s$=1/M$\Delta f$=T/M. This leads to transmit and receive pulses of length M samples.

A time-varying channel 108 is considered between the $u^{th}$ transmit and $v^{th}$ receive antennas, which are mathematically modelled as follows.

$$h_{u,v}(\tau, v) = \sum_{p=1}^{P} h_p^{(u,v)} \delta(\tau - \tau_p) \delta(v - v_p).$$ Eqn. (3)

Where, for the $p^{th}$ path between the $u^{th}$ transmit and $v^{th}$ receive antenna: (a) $h_p$ is its complex channel gain with complex Gaussian probability density function (pdf); and (b) $\tau_p$ and $v_p$ are its delay and Doppler values, which are mathematically defined as $$\tau_p = \frac{l_p}{M\Delta f} \text{ and } v_p = \frac{k_p}{NT}$$

with $l_p \in \mathbb{N}$ [0M−1], $k_p \in \mathbb{R}$ [0N−1] and. In an embodiment, $l_p$ is considered to be an integer. This is because of a wide-band system with T$\Delta_f$=1. The sampling resolution 1/M$\Delta_f$ is sufficient to approximate the path delays to the nearest sampling points. In an embodiment, parameter $k_p$ models both integer and fraction Doppler values. If $\tau_{max}$ and $v_{max}$ are maximum delay and Doppler values, then a maximum channel delay and Doppler lengths for (u, v)$^{th}$ link is provided as $\alpha = \lceil \tau_{max} M\Delta f \rceil$ and $\beta = \lceil v_{max} NT \rceil$ respectively.

In an embodiment, the multiple-input multiple-output orthogonal time frequency space (MIMO-OTFS) system 100 further includes a discrete implementation of MIMO-OTFS transmission system. The discrete MIMO-OTFS transmission system is implemented by sampling a time domain transmit signal $S_u$(t) from the above equation 2. In an embodiment, the critically sampled OTFS system with T$\Delta_f$=1, which outputs in a sampling interval of T/M. The samples are collected in a vector $s_u = [s_u(0) \ s_u(1) \ldots s_u(MN-1)]^T$ as $s_u = Ad_u$, and the vector $d^u \in \mathbb{C}^{MN \times 1}$ = vec($D_u$)∈ $\mathbb{C}^{M \times N}$ with the matrix.

$$D_u = \begin{bmatrix} d_u(0,0) & \ldots & d_u(0, N-1) \\ d_u(1,0) & \ldots & d_u(1, N-1) \\ \vdots & \ddots & \vdots \\ d_u(M-1, 0) & \ldots & d_u(M-1, N-1) \end{bmatrix}.$$ Eqn. (4)

The matrix A∈ $\mathbb{C}^{MN \times MN} = W_N \otimes I_M$ denotes the OTFS modulation matrix with $W_N$ being the N×N IDFT matrix and ⊗ denotes the matrix kronecker product. In an embodiment, the transmit vector for $N_t$ antennas is obtained by stacking $s_u$ as follows: $s=[s_1\ s_2\ \ldots\ s_N]^T$. The transmit vector s can also be written as $$s=(I_{N_t}\otimes A)d=Bd \qquad \text{Eqn. (5)}$$

Where, the vector $d \in \mathbb{C}^{MNN_t\times 1}=[d_1^T\ d_2^T\ \ldots\ d_{N_t}^T]^T$ includes QAM data symbols, and the matrix $B \in \mathbb{C}^{MNN_t\times MNN_t}=I_{N_t}\otimes A$.

In an embodiment, depending upon CP insertion 106 in an OTFS system, the system includes two variants such as (a) RCP-OTFS which appends a CP of length $L\geq \alpha$ before each OTFS frame, with $\alpha$ being the maximum channel delay spread, and (b) CP-OTFS which appends a CP 106 of length L at the beginning of each OTFS symbol in the frame. In an embodiment, a matrix is defined to model the CP addition for both RCP and CP-OTFS systems:

$$C = \begin{bmatrix} 0_L & I_L \\ I_K & 0_K \end{bmatrix}. \qquad \text{Eqn. (6)}$$

In an embodiment, the above said matrix (C) appends an L-length CP at the beginning of the K-length vector. The CP addition matrix for RCP-OTFS systems are respectively obtained as $C_{RCP}=C$ with K=MN, and $C_{CP}$=blkdiag [CC . . . C] with K=N. The transmit signals for the RCP-OTFS and CP-OTFS are obtained as $\bar{s}_{RCP}=C_{RCP}s$ and $\bar{s}_{CP}=C_{CP}s$, respectively. In an embodiment, the design of LMMSE receiver is applicable for both RCP-OTFS and CP-OTFS systems. In another embodiment, a common analysis framework is designed for the two OTFS systems.

The received signal vector $r \in \mathbb{C}^{MNN_r\times 1}$, after removing 110 the cyclic prefix (CP), is expressed as follows:

$$r=Hs+n, \qquad \text{Eqn. (7)}$$

With $H \in \mathbb{C}^{MNN_r\times MNN_t}$ being the MIMO-OTFS channel matrix and $n \in \mathbb{C}^{MNN_r\times 1}$ being the additive white Gaussian noise vector with the pdf $\mathcal{CN}(0,\sigma_n^2 I_{MNN_r})$. The MIMO-OTFS channel matrix H is expressed as follows:

$$H = \begin{bmatrix} H_{1,1} & \cdots & H_{N_t,1} \\ \vdots & \ddots & \vdots \\ H_{2,N_r} & \cdots & H_{N_t,N_r} \end{bmatrix}. \qquad \text{Eqn. (8)}$$

The channel matrix $H_{u,v}$ between the $u^{th}$ transmit and the $v^{th}$ receive antennas is:

$$H_{u,v} = \sum_{p=1}^{P} h_p^{(u,v)} \Pi^{l_p^{(u,v)}} \Delta^{k_p^{(u,v)}}. \qquad \text{Eqn. (9)}$$

Where, $\Pi=\text{circ}\{[010\ \ldots\ 0]_{MN\times 1}^T\}$ is a circulant delay matrix, and $$\Delta = \text{diag}\left\{1 e^{j2\pi\frac{1}{MN}}\ \ldots\ e^{j2\pi\frac{MN-1}{MN}}\right\}$$

is a diagonal Doppler matrix. For an ideal-pulse-shaped OTFS system, the channel matrix $H_{u,v}$ includes a doubly-circulant structure (i.e., the channel matrix includes M circulant block, each of size N×N). In an embodiment, the channel matrix $H_{u,v}$ for such systems is easily diagonalized using the Fast Fourier Transform (FFT) matrix, which simplifies their low-complexity receiver design. Further, the channel matrix $H_{u,v}$ for practical-pulse-shaped MIMO-OTFS systems, due to inter-symbol-interference (ISI) and inter-carrier-interference (ICI), is not doubly circulant.

The multiple-input multiple-output orthogonal time frequency space (MIMO-OTFS) system 100 further includes the low-complexity LMSSE receiver design for the reduced cyclic prefix OTFS (RCP-OTFS) system. The system calculates a data vector ($\hat{d}$) (116) that represents an LMMSE estimation as follows:

$$\hat{d} = \left[(HB)^\dagger(HB) + \frac{\sigma_n^2}{\sigma_d^2}I_{MNN_t}\right]^{-1}(HB)^\dagger r. \qquad \text{Eqn. (10)}$$

The system 100 executes an algorithm in the sequel is for the LMMSE receiver. In an embodiment, the algorithm is also applicable for the zero forcing (ZF) receiver. Only change is that the matrix inside the inverse operation in equation (10) is replaced by $(HB)^\dagger(HB)$. The conventional LMMSE receiver inverts an $MNN_t\times MNN_t$ matrix from the above equation (10), which includes $O(M^3N^3N_t^3)$ complexity. For practical systems, subcarriers M, transmit symbols N, and transmit antennas $N_t$ can take large values, which makes the conventional LMMSE receiver computationally inefficient. The receiver complexity needs to be significantly reduced for successfully implementing a practical MIMO-OTFS system. The proposed LMMSE/ZF receiver is designed for MIMO-OTFS systems includes a reduced computational complexity of $O(MNN_t\log_2 N_t)$ without degrading the BER using the structure of plurality of matrices involved in the LMMSE receiver.

The MIMO-OTFS system designs the LMMSE receiver by demonstrating the most computationally complex operation in the MMSE receiver, which is the inversion of a full-bandwidth positive definite multi-banded matrix, which, in general, includes a cubic order of complexity. The system proposes a method to reduce a bandwidth of the matrix. The reduced-bandwidth matrix is inverted with a significantly lower complexity. For a practical rectangular or Dirichlet pulse g(t), the matrix $B=I_{N_t}\otimes A$ in equation (5) becomes unitary. This is because of the modulation matrix $A=W_N\otimes I_M$, which becomes unitary for such pulses. The LMMSE estimation of the data vector (116) as given in equation (10) is simplified to:

$$\hat{d}=B^\dagger\Psi^{-1}H^\dagger r=\Phi r \qquad \text{Eqn. (11)}$$

Where, the matrices $$\Psi \in \mathbb{C}^{MNN_t\times MNN_t} = H^\dagger H + \frac{\sigma_n^2}{\sigma_d^2}I_{MNN_t}$$

and $$\Phi \in \mathbb{C}^{MNN_t\times MNN_t} = B^\dagger\Psi^{-1}H^\dagger$$

In an embodiment, the low-complexity LMMSE receiver is implemented in two steps. The steps are MMSE equalization ($y=\Psi^{-1}H^\dagger r$) 112 and OTFS matched filtering ($\hat{d}=B^\dagger y$) 114. In an embodiment, the OTFS matched filtering operation requires $MNN_t/2\log_2(N)$ complex multiplications and thus includes a low implementation complexity. In another embodiment, the LMMSE equalization 112 is implemented with low-complexity by splitting into two steps as (a) $\bar{r}=H^\dagger r$, and (b) $y=\Psi^{-1}\bar{r}$.

The low-complexity implementation of $\bar{r}=H^\dagger r$ is done by splitting the vector (r) $r \in \mathbb{C}^{MMN_r \times 1}$ and the vector $(\bar{r})$ $\bar{r} \in \mathbb{C}^{MMN_t \times 1}$ as $r=[r_1^{-T}\ r_2^{-T}\ \ldots\ r_{N_t}^T]^T$ and $\bar{r}=[\bar{r}_1^{-T}\ \bar{r}_2^{-T}\ \ldots\ \bar{r}_{N_t}^T]^T$. The $q^{th}$ component $\overline{r_q} \in \mathbb{C}^{MN \times 1}$ of $\bar{r}$ is computed using the channel matrix (H) expressed in equation (8) as $$\bar{r}_q = \sum_{i=1}^{N_r} H_{q,i}^\dagger r_i.$$

It is expressed using the equation (9) as $$\bar{r}_q = \sum_{i=1}^{N_r} \sum_{p=1}^{P} \bar{h}_p^{(q,i)} \Delta^{-k_p^{(q,i)}} \prod^{-l_p^{(q,i)}} r_i, \forall\, q. \qquad \text{Eqn. (12)}$$

where $\bar{h}_p^{(q,i)}$ denotes the complex conjugate of $h_p^{(q,i)}$. To implement the equation (10), the vector $r_i$ is first circularly shifted by the matrix $\Pi^{-l_p^{(q,i)}}$ and then multiplied by the diagonal matrix $\bar{h}_p^{(q,i)}\Delta^{-k_p^{(q,i)}}$, for each i, p and q using element-wise multiplication. The implementation in equation (12) requires $O(PMNN_rN_t)$ complex multiplications.

In another embodiment, the low-complexity implementation of $y=\Psi^{-1}\bar{r}$ is done by calculating the structure of the matrix $\Psi$ 118, and the inherent properties of the matrix $(\Psi)$ 118 is utilized by the system to transform into a low-bandwidth banded matrix to calculate its low-complexity inverse.

Figure 2A:
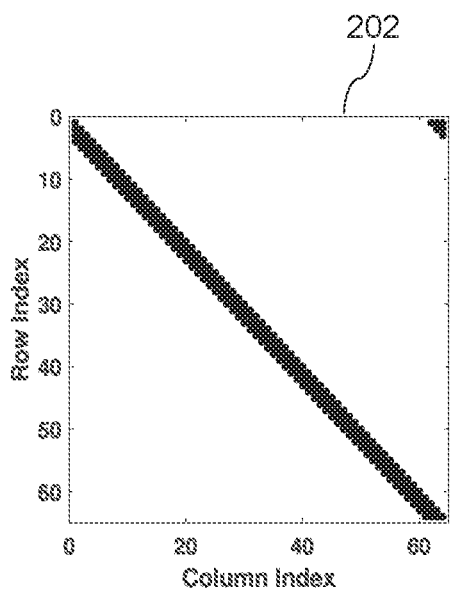
FIGS. 2A-2D are graphical representations depicting structures of a plurality of matrices involved in the LMMSE/ZF receiver in a reduced cyclic prefix OTFS (RCP-OTFS) system, in accordance with an embodiment of the present disclosure.
Figure 2B:
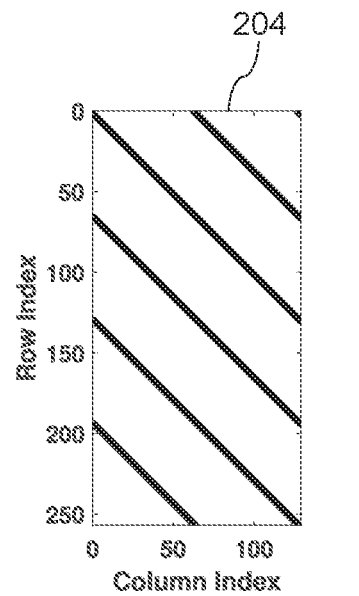

FIGS. 2A-2D are graphical representations depicting structures of a plurality of matrices involved in the LMMSE receiver in a reduced cyclic prefix OTFS (RCP-OTFS) system, in accordance with an embodiment of the present disclosure. In FIG. 2A, an entry of the matrix $H_{u,v}$ 202 is shown. The matrix $H_{u,v}$ is as defined in equation (9). In an embodiment, the matrix $H_{u,v}$ is a constituent matrix of the MIMO-OTFS channel H, and corresponds to the channel between the $u^{th}$ transmit and the $v^{th}$ receive antenna. The FIG. 2A depicts that the matrix $H_{u,v}$ 202 is sparse with two bands, with the first and second band being located in the lower and upper triangular regions, respectively. The overall channel matrix H is formed by concatenating $H_{u,v}$ according to the equation (8), thus includes multiple bands 204, as shown in FIG. 2B.

In an embodiment, the structure of the matrix $(\Psi)$ 118 in the equation (11) is split using the equation (8) as follows:

$$\Psi = \begin{bmatrix} \sum_{i=1}^{N_r} H_{1,i}^\dagger H_{1,i} + \frac{\sigma_n^2}{\sigma_d^2}I & \sum_{i=1}^{N_r} H_{1,i}^\dagger H_{2,i} - - - & \sum_{i=1}^{N_r} H_{1,i}^\dagger H_{N_t,i} \\ \sum_{i=1}^{N_r} H_{2,i}^\dagger H_{1,i} & \sum_{i=1}^{N_r} H_{2,i}^\dagger H_{2,i} + \frac{\sigma_n^2}{\sigma_d^2}I - - - & \sum_{i=1}^{N_r} H_{2,i}^\dagger H_{N_t,i} \\ \sum_{i=1}^{N_r} H_{N_t,i}^\dagger H_{1,i} & \sum_{i=1}^{N_r} H_{N_t,i}^\dagger H_{2,i} - - - & \sum_{i=1}^{N_r} H_{N_t,i}^\dagger H_{N_t,i} + \frac{\sigma_n^2}{\sigma_d^2}I \end{bmatrix} \text{Eqn. (13)}$$

In an embodiment, the matrix $(\Psi)$ 118 includes blocks of $MN \times MN$ matrices, and the matrix includes two types such as $$\Gamma_u = \sum_{i=1}^{N_r} H_{u,i}^\dagger H_{u,i} + \frac{\sigma_n^2}{\sigma_d^2} I_{MN} \text{ and } Y_{u,u_1} = \sum_{i=1}^{N_r} H_{u,i}^\dagger H_{u_1,i},$$

where u, $u_1 \in \mathbb{N}(1, N_t)$ and $u \neq u_1$. Using the equation (9), $Y_{u,u_1}$ is given as:

$$Y_{u,u_1} = \sum_{i=1}^{N_r}\sum_{p=1}^{P}\sum_{q=1}^{P} \bar{h}_p^{(u,i)} h_q^{(u_1,i)} \Delta^{-k_p^{(u,i)}} \prod^{-l_p^{(u,i)}+l_q^{(u_1,i)}} \Delta^{k_q^{(u_1,i)}}. \qquad \text{Eqn. (14)}$$

Figure 2C:
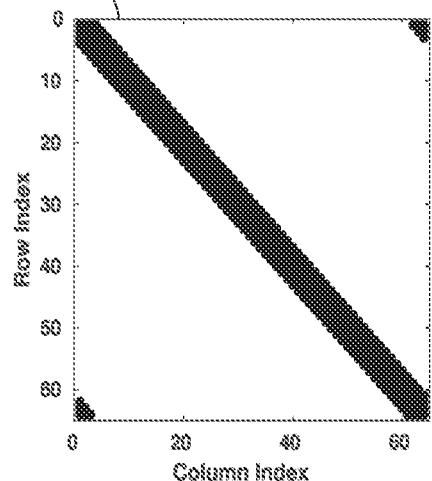
Figure 2D:
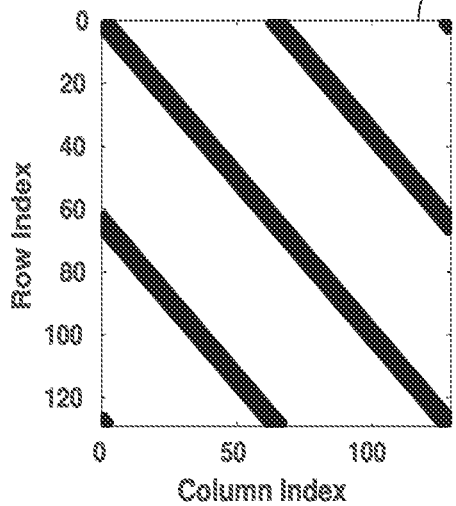

Where, $\bar{h}_p^{(u,i)}$ is a complex conjugate of $h_p^{(u,i)}$. Since $\Delta$ is a diagonal matrix, and is observed, from the equation (14), that the structure of the matrix $Y_{u,u_1}$ depends only on the matrix $\Pi^{-l_p^{(u,i)}+l_q^{(u_1,i)}}$, which shifts elements of the matrix $\Delta$, and also the maximum shift elements of $\Delta$ is $\pm(\alpha-1)$ are observed from the equation (14). Additionally, the matrix $\Pi$ introduces a cyclic shift, which leads to the matrix $Y_{u,u_1}$ 206, as shown in FIG. 2C being quasi-banded with full bandwidth, and with a maximum $2\alpha-1$ non-zero entries in each row. Similarly, FIG. 2C shows the Similarly, the matrix $\Gamma_u$ in $\Psi$, which is also a quasi-banded with full bandwidth. For a typical wireless channel, $\alpha \ll MN$. Since each block of the matrix $\Psi$ 118 is sparse, it concludes that the matrix $\Psi$ 118 is also a block sparse and a quasi-banded matrix 208, with its structure, as shown in FIG. 2D. The maximum number of non-zero entries in each row of $\Psi$ is $w=N_t(\alpha-1)$. In an embodiment, the structure of matrix $\Psi_{u,u_1}$ remains same irrespective of location of delay values of the propagation paths. In another embodiment, although $\Psi$ is sparse, its inversion still requires $O(M^3N^3N_t^3)$ complex multiplications because its bandwidth is $MNN_t$, which is equal to the bandwidth of a full matrix of size $MNN_t \times MNN_t$. The proposed design of the low-complexity LMMSE receiver thus reduces this inversion complexity by exploiting the structure of $\Psi$.

The system reorders the matrix $\Psi$ 118 by computing a permutation matrix to calculate its low-complexity inverse. The system initially defines the term structure-matrix for a matrix $C \in \mathbb{C}^{m \times n}$, as $C_s$, which shows a sparsity pattern of the matrix C. In an embodiment, the structure of matrix $\Psi$ 118 is denoted by S. The system aims to make S independent from instantaneous delay values/power delay profile. For a given value of $\alpha$, multiple power delay profiles are possible. To make the matrix S to be independent of a power delay profile, the system takes all possible locations of non-zero entries of $\Psi$, for a given $\alpha$. In an embodiment, the structure of matrix $\Psi$ 118 depends only on $$\prod^{-l_p^{(u,j)}+l_q^{(u_1,j)}},$$

where $-l_p^{(u,i)}+l_q^{(u_1,i)}$ takes value in the range $[-(\alpha-1),(\alpha+1)]$. Thus, the system substitute $k_q^{(u_1,i)}=k_p^{(u,i)}$ and $\bar{h}_p^{(u,i)}+\bar{h}_q^{(u_1,i)}=1$ in the expression of $\Gamma_u$ and $Y_{u,u_1}$ in order to obtain S. For the $(u,u_1)$th block $Y_{u,u_1}$ in the equation (14) of the matrix $\Psi$ 118, the structure of the matrix 118 is thus given as $$S_{u,u_1} \sum_{a=-(\alpha-1)}^{\alpha-1} \prod^a, \forall\, u, u_1.$$

Using this property, the structure of matrix 118 of $\Psi$ in the equation (13) is obtained as follows:

$$S = 1_{N_t \times N_t} \otimes \sum_{a=-(\alpha-1)}^{\alpha-i} \prod{}^a.\qquad\text{Eqn. (15)}$$

Where $1_{N_t \times N_t}$ is an $N_t \times N_t$ matrix with all-one elements. The structure of matrix 118 S is, therefore, independent of the instantaneous delay values, and is thus known to the receiver beforehand. In an embodiment, the matrix S is used to design a low-complexity LMMSE receiver in the subsequent steps.

In an embodiment, the structure of matrix $\Psi$ 118 depends upon the maximum delay length $\alpha$, which is commonly known at the receiver beforehand. The knowledge of $\alpha$ at the receiver implies that the structure of matrix $\Psi$ 118 is also known at the receiver, which enables the system to design a low-complexity implementation of $y=\Psi^{-1}\bar{r}$. It is well known that $H^H H$, and consequently $\Psi$, is a positive definite matrix. The bandwidth of the structure of matrix $\Psi$ 118 is reduced by reordering the structure of matrix $\Psi$ 118 and then revert the reordering after its inversion. In an embodiment, the reordering of the structure of matrix $\Psi$ 118 is performed using Reverse Cuthil-Mckee algorithm 120 for reordering a Hermitian matrix to a banded matrix. The Reverse Cuthil-Mckee 120 algorithm computes the permutation matrix $P \in \mathbb{R}^{MNN_r \times MNN_t}$ to reorder the original matrix $\Psi$. In an embodiment, the permutation matrix is dependent on the structure of matrix $S \in \mathbb{C}^{MNN_r \times MNN_t}$ of the matrix $\Psi$ 118, which is known to the receiver. In an embodiment, the permutation matrix P is computed as P=RCuthill_Mckee(S), where the function RCuthill_Mckee, is implemented offline using an in-built MATLAB function "symrcm".

The system computes a low-complexity inverse of a banded matrix (G) which is obtained by multiplying the matrix ($\Psi$) 118 with the permutation matrix (P) and with the transpose of the permutation matrix ($P^T$). The reordered matrix $G \in \mathbb{C}^{MNN_r \times MNN_t}$ computed as $$G = P\Psi P^T \qquad\text{Eqn. (16)}$$

Figure 3A:
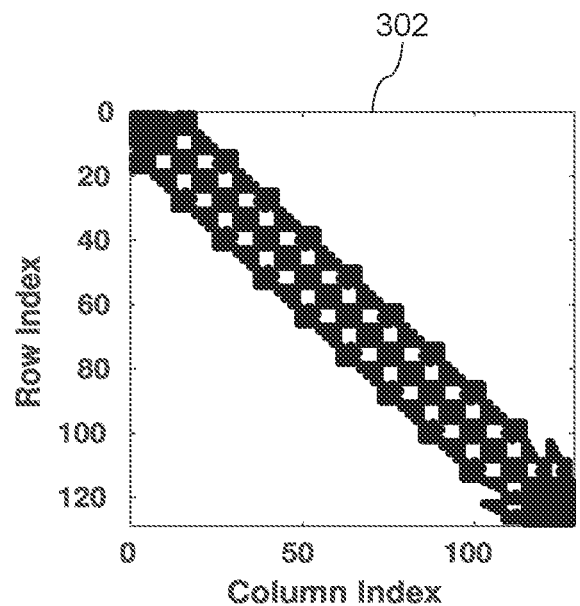
FIGS. 3A-3B are graphical representations depicting a reordered LMMSE/ZF matrix, in accordance with an embodiment of the present disclosure.
Figure 3B:
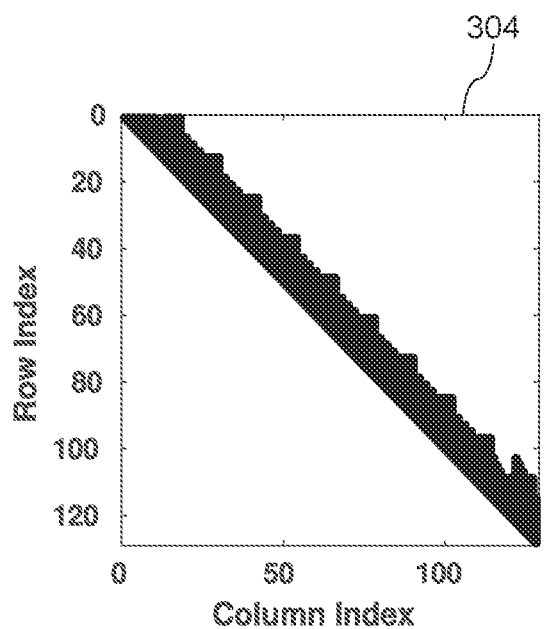

FIGS. 3A-3B are graphical representations depicting a reordered LMMSE matrix, in accordance with an embodiment of the present disclosure. FIG. 3A depicts the structures 302 of the reordered matrices G for $\Psi$ from FIG. 2D, which is now converted to a banded matrix G. In an embodiment, the bandwidth of a matrix after Reverse Cuthill-Mckee 120 transformation is upper bounded by $2w_l$, where $w_l$ is maximum number of entries among rows of the matrix. For the matrix $\Psi$ 118 with $w_l=N_t(2\alpha-1)$, the bandwidth of G is therefor $B_w \leq 2N_t(2\alpha-1)$. In practice, the bandwidth $B_w \ll MNN_t$, which implies that G is a sparse matrix. The system multiplies both sides by the permutation matrix P as $P\Psi P^T Py = P\bar{r}$ to compute $\Psi^{-1}y=\bar{r}$. This is because the permutation matrix P satisfies the following property $P^T P = I_{MNN_t}$. By substituting $\tilde{r}_{ce}=Py$ and $\bar{r}=P\bar{r}$, to get $$G\tilde{r}_{ce}=\bar{r} \Rightarrow \tilde{r}_{ce}=G^{-1}\bar{r} \qquad\text{Eqn. (17)}$$

The matrix G is a positive definite matrix as permutation retains the positive definiteness of $\Psi$. The low-complexity inverse of G is computed by performing its Cholskey decomposition: G=LU, with $U=L^T$, which for a banded matrix G is computed with $O(MNN_t B_w^2)$ complex multiplications. It is well known that L and U, as shown in FIG. 3B, are also banded matrices with $B_w$ bandwidth 304. In an embodiment, the banded structure of L and U are used for low-complexity computation of $G^{-1}$ by calculating a vector ($\tilde{r}_{ce}$) by multiplying an inverse of the banded matrices with the $B_w$ bandwidth (L and U), with the vector ($\bar{r}$) using a low-complexity forward and backward substitution algorithms. In an embodiment, the low-complexity forward substitution algorithm calculates a vector ($\bar{r}$) by multiplying an inverse of the banded matrix with the $B_w$ bandwidth (L) with the vector ($\bar{r}$). In another embodiment, the low-complexity backward substitution algorithm calculates the vector ($\tilde{r}_{ce}$) by multiplying an inverse of the banded matrix with the $B_w$ bandwidth (U) with the vector (v). The vector (y) is calculated by reordering the vector ($\tilde{r}_{ce}$) as $$y = P^T \tilde{r}_{ce}. \qquad\text{Eqn. (18)}$$

In an embodiment, both forward and backward algorithms require $O(MNN_t B_w)$ complex multiplications. The system further calculating a data vector ($\hat{d}$) 116 that represents an estimation of the low-complexity LMMSE receiver by multiplying Hermitian matrix (B) with the vector (y). For example, the estimate of data vector ($\hat{d}$) 116 is next computed as $d=B^\dagger y$. In an embodiment, using the equation (5), the operation is equivalently implemented as follows $$d = (I_{N_t} \otimes A^\dagger) y. \qquad\text{Eqn. (19)}$$

In an embodiment, the operation is implemented using $MN_t$ number of N-point IFFTs and requires $O(MNN_t \log_2 N)$ complex multiplications.

In an embodiment, the low-complexity LMMSE receiver is used in MIMO-CP-OTFS systems. The CP-OTFS system, as shown in the equation (6), adds a cyclic prefix at beginning of each OTFS symbols. The channel matrix $H_{u,v} \in \mathbb{C}^{MN \times MN}$ in the equation (9) between the $u^{th}$ transmit and the $v^{th}$ receive antennas is therefore given as $$H_{u,v} = blk\,\mathrm{diag}\{\overline{H}_{u,v}^0, \overline{H}_{u,v}^1, \dots \overline{H}_{u,v}^{N-1}\}. \qquad\text{Eqn. (20)}$$

The matrix $\overline{H}_{u,v}^q \in \mathbb{C}^{M \times M}$, $q \in \mathbb{C}[0 M-1]$ in equation (9) is expressed as follows:

$$\overline{H}_{u,v}^q = \sum_{p=1}^{P} h_p^{(u,v)} \prod l_p^{(u,v)} \Delta^{k_p^{(u,v)}} e^{j2\pi \frac{k_p^{(u,v)}(L-l_p)}{(M+L)N}} e^{j2\pi \frac{k_p^{(u,v)}}{N} q}, \qquad\text{Eqn. (21)}$$

where $$\Delta = \mathrm{diag}\left\{1\, e^{j2\pi \frac{1}{(M+L)N}} \dots e^{j2\pi + \frac{M-1}{(M+L)N}}\right\} \text{ and } \prod = circ\{[0, 1, \dots, 0]^T\}$$

are Doppler and delay matrices for CP-OTFS transmission. For a CP-OTFS system, the $a^{th}$ component $\bar{r}_{q,a}$ of the vector $\bar{r}_q$ in equation (12) is computed using the equation (20) as $$\bar{r}_{q,a} = \sum_{i=1}^{N_r} \overline{H}_{q,i}^{a\dagger} r_{q,i}.$$

The vector $\bar{r}_{q,a}$, after expanding using the equation (21), is implemented by first circularly shifting $r_{q,a}$ by $\Pi^{-l_p^{(q,i)}}$, and then by multiplying with the diagonal matrix $\bar{h}_p^{(q,i)} \Delta^{-k_p^{(q,i)}}$, for each i, p and q using element-wise multiplication. In an embodiment, the implementation of $\bar{r}_{q,a}$ requires $O(PMNN_r N_t)$ complex multiplications.

Figure 4A:
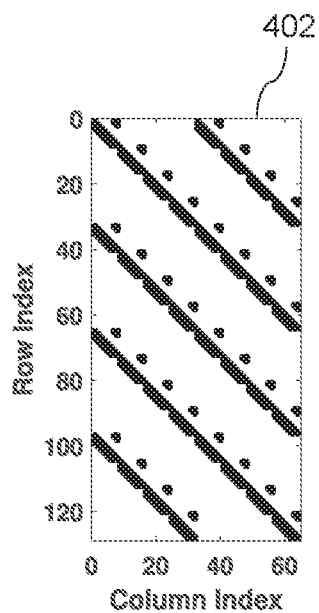
FIG. 4A-4C are graphical representations depicting structures of a plurality of matrices involved in the LMMSE/ZF receiver in a cyclic prefix OTFS (CP-OTFS) system, in accordance with an embodiment of the present disclosure.
Figure 4B:
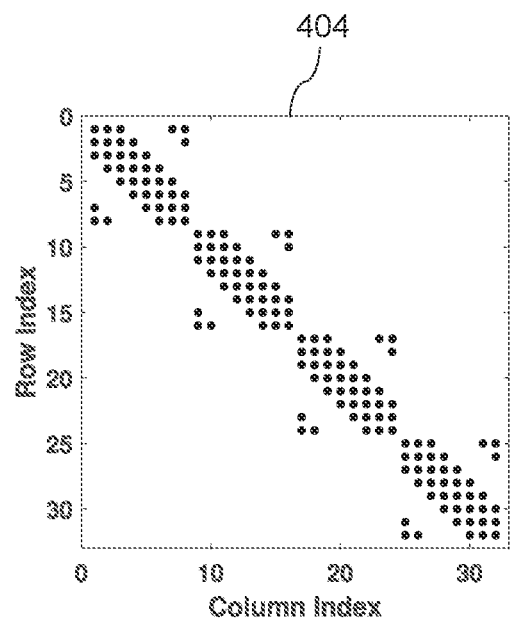
Figure 4C:
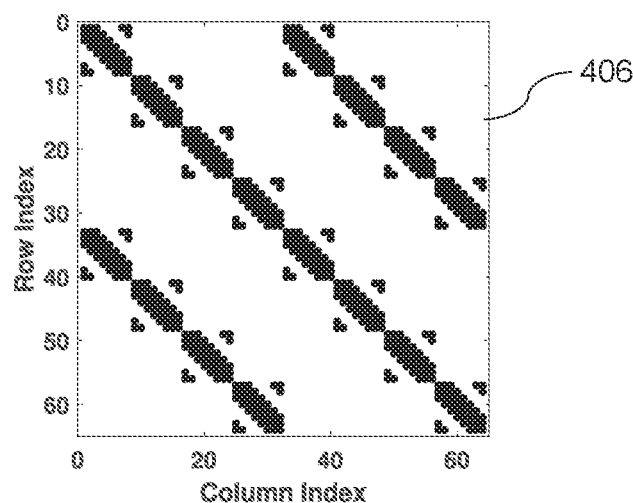

FIG. 4A-4C are graphical representations depicting structures of a plurality of matrices involved in the LMMSE receiver in a cyclic prefix OTFS (CP-OTFS) system, in accordance with an embodiment of the present disclosure. FIG. 4A shows that the MIMO-OTFS channel matrix H for a CP-OTFS system 402 is multi-banded similar to an RCP-OTFS system. This is because the constituent matrices $H_{u,v}$ of the MIMO-OTFS channel matrix H are block-diagonal and sparse. The matrix $\Psi$ 118 in equation (11) is rewritten using equations (20) and (21) as follows:

$$\Psi = \begin{bmatrix} blk\,\text{diag}\{\Gamma_{1,1} \ldots \Gamma_{1,N}\} & \ldots & blk\,\text{diag}\{\overline{\gamma}_{1,N_t,1} \ldots \overline{\gamma}_{1,N_t,N}\} \\ \vdots & \ddots & \vdots \\ blk\,\text{diag}\{\overline{\gamma}_{N_t,1,1} \ldots \overline{\gamma}_{N_t,1,N}\} & \ldots & blk\,\text{diag}\{\Gamma_{N_t,1} \ldots \Gamma_{N_t,N}\} \end{bmatrix} \quad \text{Eqn. (22)}$$

The matrix $\Gamma_{u,q}$ is written as $$\Gamma_{u,q} = \sum_{i=1}^{N_r} \overline{H}_{u,i}^{q\dagger} \overline{H}_{u,i}^{q\dagger} + \frac{\sigma_n^2}{\sigma_d^2} I, \text{ and } \overline{\gamma}_{u,u_1,q}$$

is written as $$\overline{\gamma}_{u,u_1,q} = \sum_{i=1}^{N_r} \overline{H}_{u,i}^{q\dagger} \overline{H}_{u_1,i}^{q}.$$

Also, $u, u_1 \in \mathbb{N}(1,N_t)$, $q \in \mathbb{N}(1,N)$ are provided. In an embodiment, each $MN \times MN$ block of the matrix $\Psi$ 118 is block diagonal, with each block of size $M \times M$. Using the equation (21), $$\overline{\gamma}_{u,u_1,q} = \sum_{i=1}^{N_r} \sum_{p=1}^{P} \sum_{p_1=1}^{P} \overline{h}_p^{(u,i)} h_{p_1}^{(u_1,i)} \Delta^{-k_p^{(u,i)}} \quad \text{Eqn. (23)}$$

$$\prod^{-l_p^{(u,i)}+l_{p_1}^{(u_1,i)}} \Delta^{k_{p_1}^{(u_1,i)}} e^{j2\pi \frac{k_{p_1}^{(u_1,i)} l_{p_1}^{(u_1,i)} - k_p^{(u,i)} l_p^{(u,i)}}{(M+L)N}} e^{j2\pi \frac{k_{p_1}^{(u_1,i)} - k_p^{(u,i)}}{N}}.$$

Where $\overline{h}_p^{(u,i)}$ denotes the complex conjugate of $h_p^{(u,i)}$. In an embodiment, the structure of $\overline{\gamma}_{u,u_1,q}$ depends only on the matrix $$\prod^{-l_p^{(u,j)}+l_q^{(u_1,j)}},$$

based on a diagonal nature of $\Delta$. The matrix $\overline{\gamma}_{u,u_1,q}$ is quasi-banded with maximum $2\alpha-1$ non-zero. Similarly, the matrix $\Gamma_{u,q}$ 404 in $\Psi$, as shown in FIG. 4B, is also quasi-banded with maximum $2\alpha-1$ non-zero entries in each row. Further, the FIG. 4C shows the multi-banded matrix $\Psi$ 406. In an embodiment, the total number of non-zero entries in each row of $\Psi$ is $w=N_t(2\alpha-1)$. Although $\Psi$ is sparse, its matrix inversion still requires $O(M^3N^3N_t^3)$ complex multiplications due to its $MN(N_t-1)+M$ bandwidth. The multi-banded structure of $\Psi$ implies that the proposed Algorithm is used for designing the low-complexity LMMSE receiver for the MIMO-CP-OTFS systems.

In an embodiment, the structure of matrix of $\Psi$ 118 is defined for CP-OTFS systems by taking Doppler values and channel gains in equation (23) as $k_p^{(u,v)}$ and $h_p^{(u,v)}=1$ $\forall p,u,v$, respectively as $$S = 1_{N_t \times N_t} \otimes \left[ I_N \otimes \sum_{a=-(\alpha-1)}^{\alpha-1} \prod^a \right]. \quad \text{Eqn. (24)}$$

In an embodiment, the system utilizes the matrix S and the matrix $\Psi$ 118 given in equation (22) in the algorithm for the low-complexity implementation of the LMMSE receiver for MIMO-CP-OTFS systems. In another embodiment, the low-complexity LMMSE receiver is used in a multiple-input multiple-output orthogonal frequency division multiplexing (MIMO-OFDM) over a time varying channel. Generally, a MIMO-cyclic prefix (CP)-OFDM system requires one-tap MMSE receiver for a quasi-static channel. In a rapidly time-varying channel, an OFDM system experiences ICI, which the one-tap equalizer fails to cancel. This necessitates a multi-tap equalizer for MIMO-OFDM receiver in such scenarios, which includes a high complexity. Hence, the proposed algorithm is used for designing a low-complexity LMMSE receiver for MIMO-OFDM systems. The difference while applying the algorithm for the MIMO-OTFS system and the MIMO-OFDM system is the choice of the matched filter matrix B. For OFDM systems, the unitary matrix $B=I_{NN_t} \otimes W_M$ whereas for the OTFS systems, $B=I_{N_t} \otimes W_M \otimes I_M$.

In an embodiment, the estimate d of the data vector 116 for a time-varying MIMO-OFDM system is obtained by substituting B as $I_{N_t} \otimes I_N \otimes W_M = I_{NN_t} \otimes W_M$. The proposed low-complexity MIMO-OTFS LMMSE receiver is easily extended to this scenario by simply taking $B=I_{NN_t} \otimes W_M$ in equation, (11), which is also implemented for MIMO-OFDM system. Therefore, the estimate d is calculated as $d=(I_{NN_t} \otimes W_M^\dagger)r_{ce}$, with $NN_t$ number of M-point FFTs.

The system further computes the complexity of the proposed LMSSE receivers for MIMO-OTFS and MIMO-OFDM systems in terms of complex multiplications. In an embodiment, the complexity of the proposed ZF and MMSE receivers is same. The system calculates the complexity of the proposed LMMSE receivers and compares the calculated results with existing receivers. The system further compares the complexity of the proposed receiver with that of the existing MIMO-OTFS receivers. In an embodiment, the bandwidth $B_w$ of the matrix $\Psi$ 118 for both CP-OTFS and RCP-OTFS systems is same, and the proposed algorithm is used to invert the matrix $\Psi$ 118 in both the MIMO-OTFS including MIMO-RCP-OTFS and MIMO-CP-OTFS and the MIMO-OFDM systems. The computational complexities of the ZF and LMMSE receivers for both CP-OTFS and RCP-OTFS systems are therefore the same.

| Scheme | Number of Complex multiplications |
|---|---|
| Conv. MMSE for MIMO-OTFS | $\frac{MNN_t}{2} \log_2(N) + \frac{2}{3}(MNN_t)^3 + \frac{2}{3}N_t^2 N_r(MN)^3 + 2(MNN_t)^2$ |
| Proposed MMSE for MIMO-OTFS | $MNN_t N_r P(N_t P + 1) + 2MNN_t B_w(B_w + 1) + \frac{MNN_t}{2} \log_2 N$ |

-continued

| Scheme | Number of Complex multiplications |
|---|---|
| Conv. MMSE for MIMO-OFDM | $\frac{MNN_t}{2} \log_2(M) + \frac{2}{3}(MNN_t)^3 + \frac{2}{3}N_t^2 N_r (MN)^3 + 2(MNN_t)^2$ |
| Proposed MMSE for MIMO-OFDM | $MNN_t N_r P(N_t P + 1) + 2MNN_t B_w (B_w + 1) + \frac{MNN_t}{2} \log_2 M$ |
| MP for MIMO-OTFS | $O(N_t N_r^2 N_t MNP^2 Q)$ |

The system compares the computational complexity of the proposed, conventional (direct implementation) LMMSE and the MP receivers for MIMO-OTFS and MIMO-OFDM systems in the above table.

The proposed MIMO-OTFS receiver requires $O(MNN_t^2 N_r P^2 + MNN_t^3 + MNN_t \log(N))$ complex multiplications, whereas it is $O(M^3 N^3 N_t^3)$ for its conventional counterpart. In an embodiment, a similar complexity behavior is also observed for MIMO-OFDM receivers. In a typical situation, i.e., $\alpha$, Nr,Nt,P<<MN, the number of complex multiplications is approximated as $O(MNN_t \log(N))$, which is significantly lower than the conventional LMMSE receiver for MIMO-OTFS systems. The complexity reduction is achieved by exploiting the inherent sparsities in H and $\Psi$. The computational complexity of the MP detector is $O(N_t N_r^2 N_t MNP^2 Q))$, where $N_t$ denotes the number iterations required by the MP algorithms to converge, and Q represents the constellation order. In an embodiment, the system numerically demonstrates this complexity reduction in the sequel.

The system computes the performance of the proposed low-complexity receivers for both RCP-OTFS and CP-OTFS systems. The system considers a spatially multiplexed $N_r \times N_t (N_r \geq N_t)$ MIMO-OTFS system with a subcarrier spacing of 15 KHz, which operates at a carrier frequency of 4 GHz. Each OTFS frame includes $N \in \{10,32\}$ time slots, and each time slot includes $M \in \{32,256\}$ subcarriers. The information symbols are given from 4-QAM and 16-QAM constellations. The Doppler values are generated using Jake's formula $v_p = v_{max} \cos(\theta_p)$, where $\theta_p$ is uniformly distributed over $[-\pi,\pi]$. The system further considers an Extended Vehicular A (EVA) channel model, and a maximum vehicular speed of 500 Kmph. The CP is chosen long enough to accommodate the wireless channel delay spread. The SNR is defined as $\sigma_d^2/\sigma_n^2$.

Figure 5A:
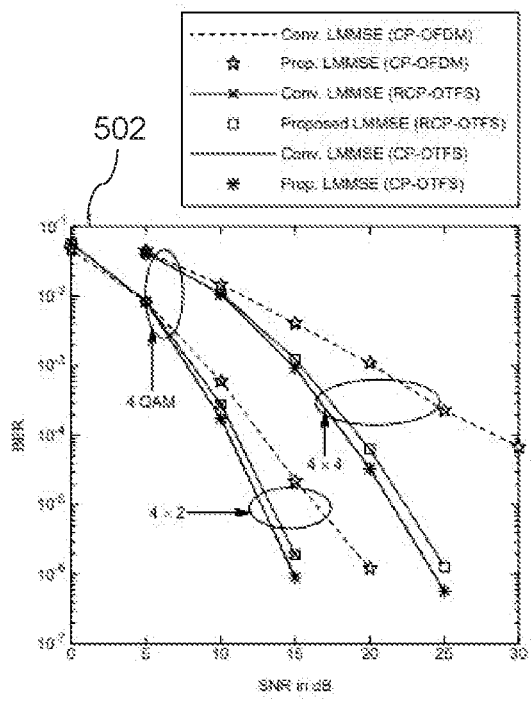
FIGS. 5A-5C are graphical representations depicting a bit error rate (BER) comparison between the proposed LMMSE receiver and conventional LMMSE receivers for different quadrature amplitude modulation (QAM), in accordance with an embodiment of the present disclosure.
Figure 5B:
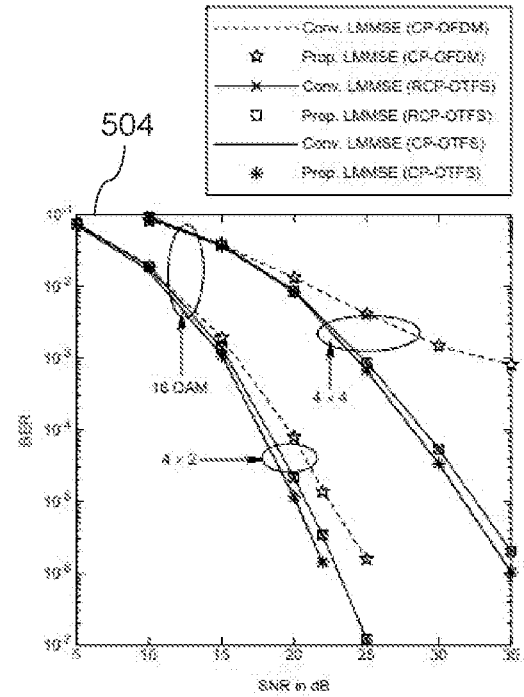
Figure 5C:
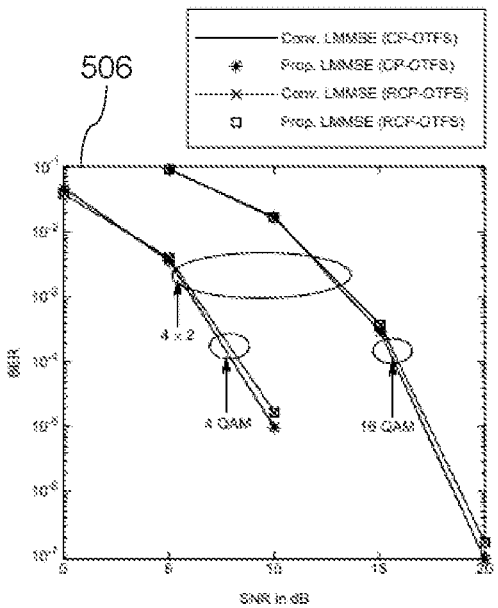

FIGS. 5A-5C are graphical representations depicting a bit error rate (BER) comparison between the proposed LMMSE receiver and conventional LMMSE receivers for different quadrature amplitude modulation (QAM), in accordance with an embodiment of the present disclosure. FIGS. 5A and 5B show results of the BER comparison between the proposed LMMSE receiver and conventional LMMSE receivers for 4-QAM 502 and 16-QAM 504 with Nt=4, $N_r$=4 MIMO configurations (i.e., 32 subcarriers (M=32), and 32 time slots (N=32)), respectively. FIGS. 5A and 5B show that the proposed low-complexity LMMSE receiver for MIMO-CP-OTFS, MIMO-RCP-OTFS, and MIMO-CP-OFDM systems show the same BER as that of their high-complexity conventional counterparts. This is because of the proposed low-complexity LMMSE receiver does not make any approximation while equalizing. In an embodiment, the OTFS system vastly outperforms its OFTM counterpart for a rapidly time varying channel.

FIG. 5C shows that the BER of the proposed and conventional MMSE receivers match 506 for an OTFS frame with a higher number of subcarrier and lower number of time slots i.e., M=256 and N=10, respectively. FIG. 5C further shows the efficacy of the proposed receiver for different OTFS subcarriers and time slots configurations.

Figure 6A:
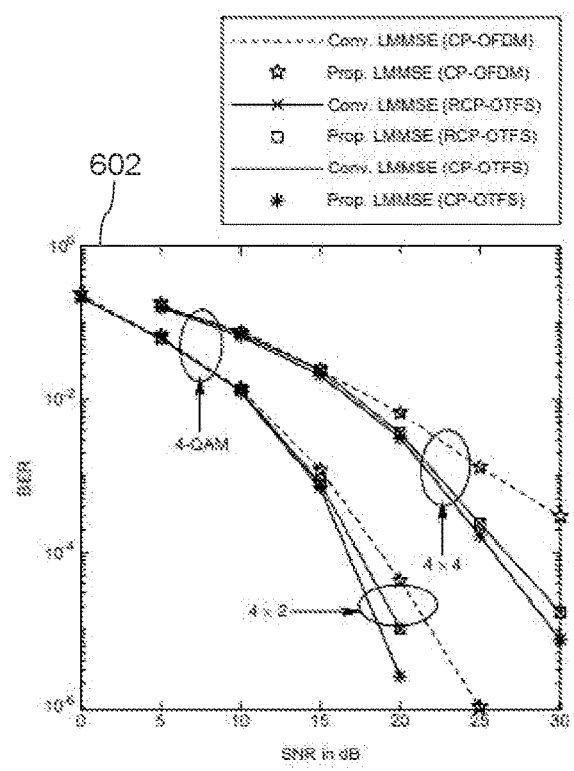
FIGS. 6A-6B are graphical representations depicting a bit error rate (BER) comparison between the proposed LMMSE receiver and conventional LMMSE receivers for MIMO-OTFS systems for different quadrature amplitude modulation (QAM), in accordance with an embodiment of the present disclosure.
Figure 6B:
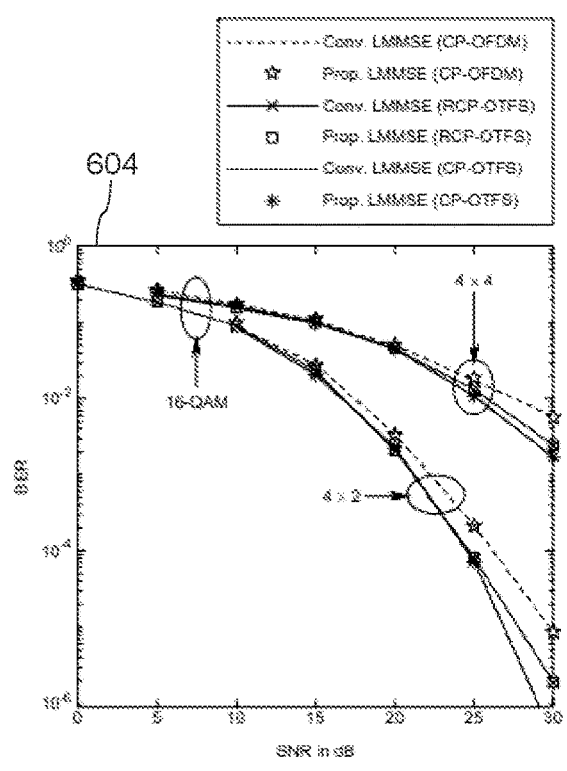

FIGS. 6A-6B are graphical representations depicting a bit error rate (BER) comparison between the proposed LMMSE receiver and conventional LMMSE receivers for MIMO-OTFS systems for different quadrature amplitude modulation (QAM), in accordance with an embodiment of the present disclosure. FIGS. 6A-6B show results (602, 604) of the BER comparison between the proposed LMMSE receiver and conventional LMMSE receivers for an imperfect receive channel state information (CSI) and Extended Vehicle A (EVA) channel with 32 subcarriers (M=32), and 32 time slots (N=32). The channel estimate is modelled as H=H+$\Delta$H. The term $\Delta H \in \mathbb{C}^{N_r MN \times N_t MN}$ is the estimation error matrix, which is independent of the matrix H. In an embodiment, the structure of $\Delta$H is same as the matrix H. The non-zero entries in a row or a column of the block $\Delta$H are independent and identically distributed (i.i.d) with pdf $CN(0,\sigma_e^2)$. The variance $\sigma_e^2$ captures a channel estimator accuracy. The channel estimation error variance for generating $\Delta$H is set as $\sigma_e^2 = 1/(N_t * SNR)$.

FIGS. 6A-6B show the BER of the proposed and conventional MMSE receivers matches (602, 604) again for both MIMO-OTFS and MIMO-OFDM systems. The OTFS system still has a significantly lower BER than OFDM. The graphical representation shows that the proposed receiver works well even with the imperfect receive CSI.

Figure 7A:
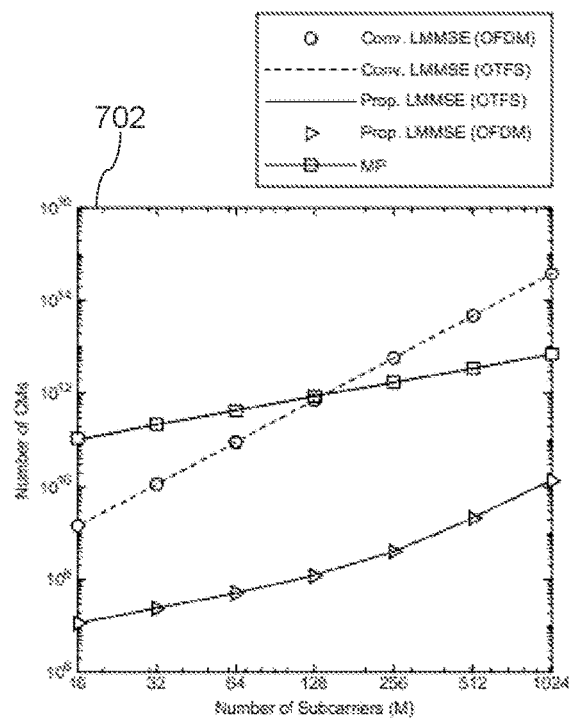
FIGS. 7A-7B are graphical representations depicting a computational complexity comparison between the proposed LMMSE receiver and the conventional LMMSE and MP receivers, in accordance with an embodiment of the present disclosure.
Figure 7B:
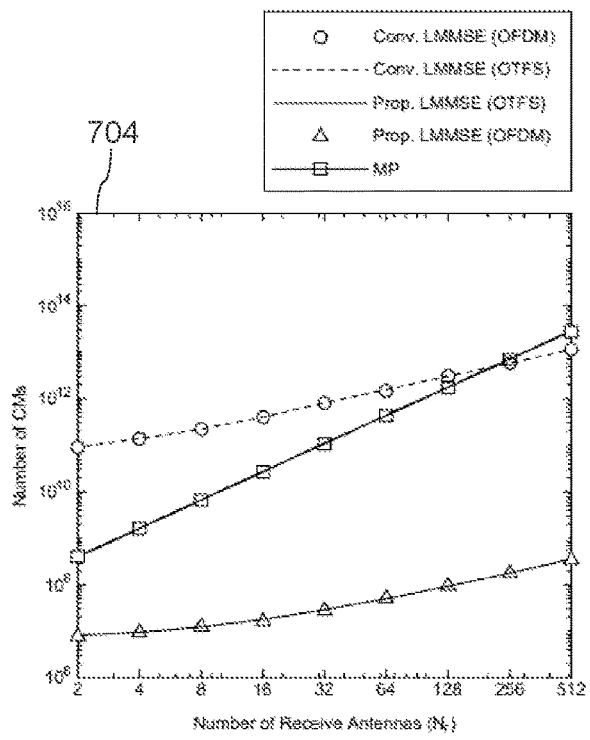

FIGS. 7A-7B are graphical representations depicting a computational complexity comparison between the proposed LMMSE receiver and the conventional LMMSE and MP receivers, in accordance with an embodiment of the present disclosure. The system compares the analytical computational complexities of the proposed ZF/MMSE receivers (as shown in above table) and the conventional LMMSE and MP receivers. FIG. 7A shows the performance of complexity comparison 702 for M$\in$[16, 1024] and FIG. 7B shows the performance of complexity comparison 704 for $N_r \in$[2, 512]. The system computes the worst-case computational complexity of the proposed receiver by considering the upper limit on $B_w$, which is $2N_t(2\alpha-1)$, for both RCP-OTFS and CP-OTFS systems. In an embodiment, the ZF/MMSE receiver complexity for both CP-OTFS and RCP-OTFS systems is same. For the MP receiver, the number of iterations $N_t$=20.

The proposed ZF/MMSE receivers include significantly lower complexity than the conventional ZF/MMSE and MP receivers for all subcarrier values, as shown in FIG. 7A. Further, the proposed ZF/MMSE receivers include the lowest complexity than the conventional ZF/MMSE and MP receivers for all subcarrier values for different number of receive antennas $N_r$, as shown in FIG. 7B. In an embodiment, the MP receiver complexity, due to the $N_r^2$ term, is higher than even the conventional ZF/MMSE receivers, for high $N_r$ values. The results also show that the proposed low-complexity receiver includes the same complexity for OTFS and OFDM systems.

Figure 8:
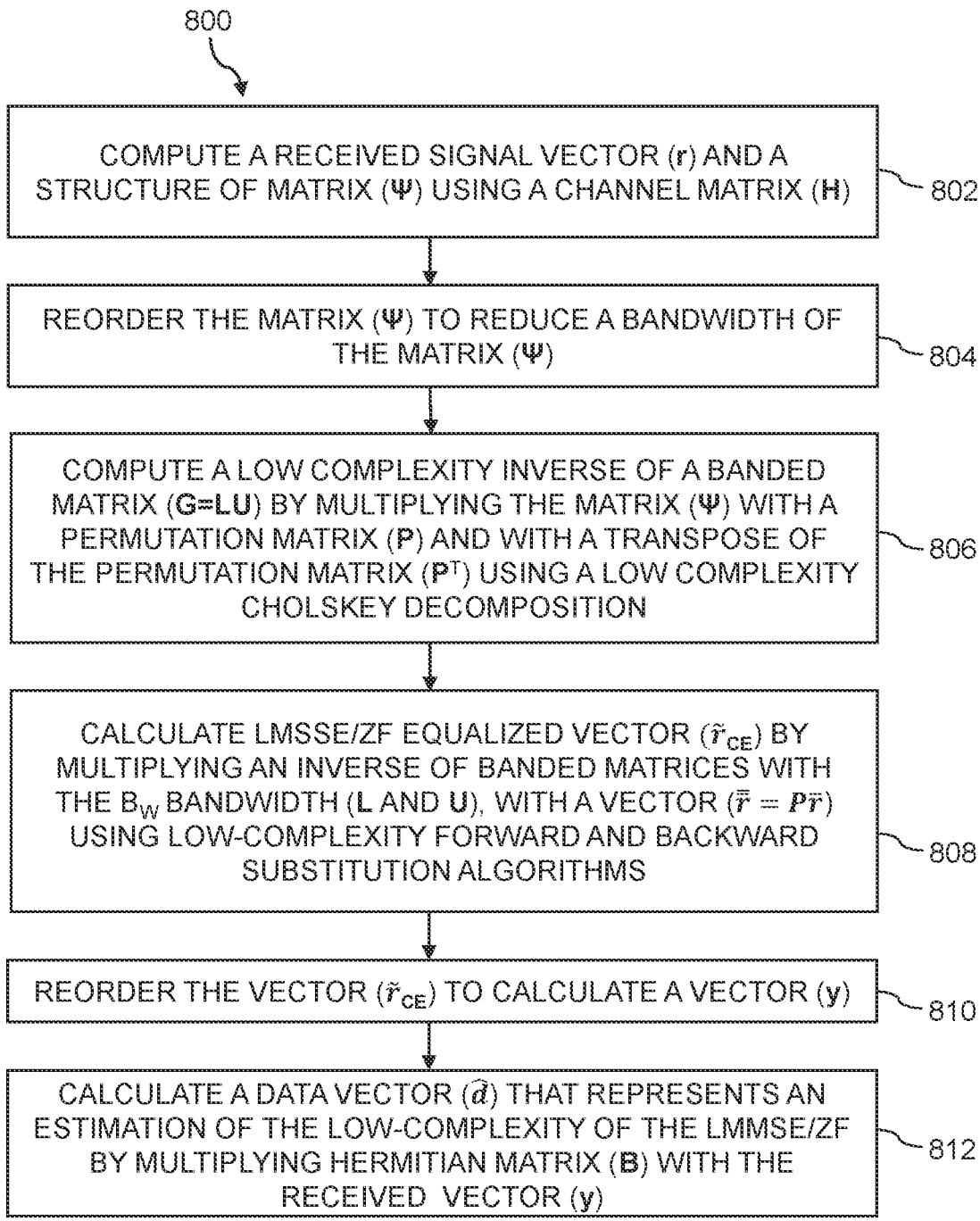
FIG. 8 is a flowchart illustrating a computer implemented method for designing a multiple-input multiple-output orthogonal time frequency space (MIMO-OTFS) system with a low-complexity linear minimum mean squared error (LMMSE) receiver, as shown in FIG. 1, in accordance with an embodiment of the present disclosure.

FIG. 8 is a flowchart illustrating a computer implemented method 800 for designing a multiple-input multiple-output orthogonal time frequency space (MIMO-OTFS) system with a low-complexity linear minimum mean squared error (LMMSE) receiver, as shown in FIG. 1, in accordance with an embodiment of the present disclosure. At step 802, a received signal vector (r) and a structure of matrix ($\Psi$) are computed using a channel matrix (H). At step 804, the matrix ($\Psi$) 118 is reordered to reduce its bandwidth 118. In an embodiment, the reordering of the matrix ($\Psi$) 118 is performed using a reverse Cuthil-mckee algorithm 120. In another embodiment, the reverse Cuthil-mckee algorithm 120 computes a permutation matrix (P) to reorder the matrix ($\Psi$) 118. At step 806, a low-complexity inverse of a banded matrix (G=LU) is computed by multiplying the matrix ($\Psi$) 118 with the permutation matrix (P) and with the transpose of the permutation matrix ($P^T$) using a low-complexity Cholskey decomposition, wherein L and U are banded matrices with a bandwidth ($B_w$).

At step 808, an LMSSE estimated 112 vector ($\tilde{r}_{ce}$) is calculated by multiplying an inverse of the banded matrices with the $B_w$ bandwidth (L and U), with the vector ($\bar{r}=P\tilde{r}$) using a low-complexity forward and backward substitution algorithms. At step 810, the vector ($\tilde{r}_{ce}$) is reordered to calculate a vector (y). In an embodiment, the vector (y) is calculated by multiplying the transpose of the permutation matrix ($P^T$) with the vector ($\tilde{r}$). At step 812, a data vector ($\hat{d}$) 116 that represents an estimation of the low-complexity of the LMMSE equalizer, is calculated by multiplying Hermitian matrix (B) with the vector (y).

In an embodiment, the low-complexity forward substitution algorithm calculates a vector (v) by multiplying an inverse of the banded matrix with the $B_w$ bandwidth (L) with the vector ($\bar{r}=P\tilde{r}$). In another embodiment, the low-complexity backward substitution algorithm calculates the LMMSE estimate 112 ($\tilde{r}_{ce}$) by multiplying an inverse of the banded matrix with the $B_w$ bandwidth (U) with the vector (v).

The present disclosure provides various advantages. The present disclosure provides the proposed LMMSE/ZF receiver does not use any approximation so that the proposed LMMSE/ZF receiver yields exactly the same results, and hence the same bit error rate (BER), as that of their conventional counterparts with a cubic order of complexity. The proposed LMMSE/ZF receiver achieves the low-complexity without any BER degradation, when compared with its conventional counterpart. This is because of the proposed LMMSE/ZF receiver, which only exploits the inherent properties of the OTFS channel matrix for reducing the complexity and does not use any approximation.

The proposed LMMSE/ZF receiver in the present disclosure equalizes symbols in a time-frequency domain, and therefore, the proposed LMMSE/ZF receiver is applicable for low-complexity equalization 112 in OFDM transmission over time-varying channels. The present disclosure determines the low complexity zero-forcing (ZF) and the linear minimum mean square error (LMMSE) receivers for OTFS based multiple-input multiple-output (MIMO)/multi-user MIMO/massive MIMO system for reducing the complexity. Further, the proposed LMMSE receiver has been designed to have a significantly lower BER than OFDM over vehicular speeds ranging from 30 km/h to 500 km/h by multiplexing symbols in the Delay-Doppler (DD) domain.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O)) devices (including but not limited to keyboards, displays, pointing devices, and the like.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like, of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method for designing a low-complexity linear minimum mean squared error (LMMSE) and zero-forcing (ZF) receivers for a multiple input multiple output reduced cyclic prefix orthogonal time frequency space (MIMO-RCP-OTFS) system, the method comprising:
   determining, using a hardware processor, a received signal (r) and a structure of LMMSE filter ($\Psi$) using a MIMO-OTFS channel (H);
   reordering, using the hardware processor, the LMMSE filter ($\Psi$) to reduce a bandwidth of the LMMSE filter ($\Psi$), wherein the reordering of the LMMSE filter ($\Psi$) is performed using a reverse Cuthil-mckee technique, and wherein the reverse Cuthil-mckee technique determines a permutation operation (P) to reorder the LMMSE filter ($\Psi$);
   determining, using the hardware processor, a low-complexity inverse operation ($G^{-1}=U^{-1}L^{-1}$) of an operation G based on the LMMSE filter ($\Psi$) and the permutation operation (P) and with a transpose of the permutation operation ($P^T$) using a Cholskey decomposition technique, wherein L is a lower triangular banded representation of the operation G with the bandwidth ($B_w$), and wherein U is an upper triangular banded representation of the operation G with the bandwidth ($B_w$);
   determining, using the hardware processor, LMMSE/ZF equalized signal ($\tilde{r}_{ce}$) based on the low complexity inverse operation and a processed signal ($\bar{r}=P\bar{r}$) using forward substitution technique and backward substitution technique, wherein a signal $\bar{r}$ is determined based on the MIMO-OTFS channel (H) and the received signal r;
   reordering, using the hardware processor, the LMMSE/ZF equalized signal ($\tilde{r}_{ce}$) to determine a first signal (y), wherein the first signal (y) is determined based on the transpose of the permutation operation ($P^T$) and the LMMSE/ZF equalized signal ($\tilde{r}_{ce}$); and
   determining, using the hardware processor, a low-complexity LMMSE/ZF estimate of a data signal ($\hat{d}$) that represents the low-complexity LMMSE/ZF receivers based on unitary function (B) and the first signal (y), wherein the designing of the LMMSE/ZF receivers comprises a combination of Minimum Mean Squared Error (MMSE) equalization technique and Orthogonal time frequency space (OTFS) matched filtering technique.

2. The method as claimed in claim 1, wherein the forward substitution technique determines a second signal (v) by multiplying an inverse of the lower triangular banded representation (L) with the bandwidth ($B_w$) with the processed signal ($\bar{r}=P\bar{r}$).

3. The method as claimed in claim 2, wherein the backward substitution technique determines the LMMSE/ZF equalized signal ($\tilde{r}_{ce}$) by multiplying an inverse of the upper triangular banded representation (U) with the bandwidth ($B_w$) with the second signal (v).

4. The method as claimed in claim 1, wherein the permutation operation (P) is determined as P=RCuthil_Mckee (S), and wherein the reverse Cuthil-mckee technique RCuthil_Mckee(S) is implemented offline using an in-built MATLAB function "symrcm".

5. A system for designing a low-complexity linear minimum mean squared error (LMMSE) and zero-forcing (ZF) receivers for a multiple input multiple output reduced cyclic prefix orthogonal time frequency space (MIMO-RCP-OTFS) system, the system comprising:
   a hardware processor; and
   a memory coupled to the hardware processor, wherein the memory comprises a set of program instructions executed by the hardware processor, wherein the hardware processor is configured to:
      determine a received signal (r) and a structure of LMMSE filter ($\Psi$) using a MIMO-OTFS channel (H);
      reorder the LMMSE filter ($\Psi$) to reduce a bandwidth of the LMMSE filter ($\Psi$), wherein the reordering of the LMMSE filter ($\Psi$) is performed using a reverse Cuthil-mckee technique, and wherein the reverse Cuthil-mckee technique determines a permutation operation (P) to reorder the LMMSE filter ($\Psi$);
      determine a low-complexity inverse operation ($G^{-1}=U^{-1}L^{-1}$) of an operation G based on the LMMSE filter ($\Psi$), the permutation operation (P) and a transpose of the permutation operation ($P^T$) using a Cholskey decomposition technique, wherein L is a lower triangular banded representation of the operation G with the bandwidth ($B_w$), and wherein U is an upper triangular banded representation of the operation G with the bandwidth ($B_w$);

determine LMMSE/ZF equalized signal ($\tilde{r}_{ce}$) based on the low complexity inverse operation, and a processed signal ($\bar{r}=P\bar{r}$) using forward substitution technique and backward substitution technique, wherein a signal r is determined based on the MIMO-OTFS channel (H) and the received signal r;

reorder the LMMSE/ZF equalized signal ($\tilde{r}_{ce}$) to determine a first signal (y), wherein the first signal (y) is determined based on the transpose of the permutation operation ($P^T$) and the LMMSE/ZF equalized signal ($\tilde{r}_{ce}$); and determine a low-complexity LMMSE/ZF estimate of a data signal ($\hat{d}$) that represents the low-complexity LMMSE/ZF receivers based on unitary function (B) and the first signal (y), wherein the designing of the LMMSE/ZF receivers comprises a combination of Minimum Mean Squared Error (MMSE) equalization technique and Orthogonal time frequency space (OTFS) matched filtering technique.

6. The system as claimed in claim 5, wherein the forward substitution technique determines a second signal (v) by multiplying an inverse of the lower triangular banded representation (L) with the bandwidth ($B_w$) with the processed signal ($\bar{r}=P\bar{r}$).

7. The system as claimed in claim 6, wherein the backward substitution technique determines the LMMSE/ZF equalized signal ($\tilde{r}_{ce}$) by multiplying an inverse of the upper triangular banded representation (U) with the bandwidth ($B_w$) with the second signal (v).

8. The system as claimed in claim 5, wherein the permutation operation (P) is determined as P=RCuthil_Mckee(S), and wherein the reverse Cuthil-mckee technique RCuthil_Mckee(S) is implemented in offline using an in-built MATLAB function "symrcm".

* * * * *